United States Patent
Lewis et al.

(10) Patent No.: US 10,425,372 B2
(45) Date of Patent: Sep. 24, 2019

(54) NOTIFICATION TARGETING BASED ON DOWNSTREAM USER ENGAGEMENT

(71) Applicant: GOOGLE INC., Mountain View, CA (US)

(72) Inventors: Justin Lewis, Marina del Rey, CA (US); Ruxandra Georgiana Davies, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 232 days.

(21) Appl. No.: 14/829,211

(22) Filed: Aug. 18, 2015

(65) Prior Publication Data

US 2017/0054669 A1 Feb. 23, 2017

(51) Int. Cl.
*H04L 12/58* (2006.01)
*H04M 19/04* (2006.01)

(52) U.S. Cl.
CPC ............ *H04L 51/24* (2013.01); *H04M 19/04* (2013.01); *H04L 51/10* (2013.01)

(58) Field of Classification Search
CPC ......... H04L 51/24; H04L 51/10; H04M 19/04
See application file for complete search history.

(56) References Cited

U.S. PATENT DOCUMENTS

| | | | | |
|---|---|---|---|---|
| 8,473,550 B2 * | 6/2013 | Nguyen | ........... | H04N 21/23103 709/204 |
| 8,615,221 B1 * | 12/2013 | Cosenza | ................. | H04M 3/42 455/414.1 |
| 8,655,970 B1 * | 2/2014 | Cohen | .................... | G06Q 30/00 455/412.2 |
| 8,676,911 B1 * | 3/2014 | Parkinson | .......... | H04N 21/4307 705/319 |
| 8,698,835 B1 * | 4/2014 | Shiplacoff | ............. | G06T 11/001 345/589 |

(Continued)

FOREIGN PATENT DOCUMENTS

| | | |
|---|---|---|
| RU | 2482539 C2 | 5/2013 |
| RU | 2491768 C1 | 8/2013 |

OTHER PUBLICATIONS

International Searching Authority, U.S., Notification of Transmittal of the International Search Report and the Written Opinion of the International Search Authority, or the Declaration for International application No. PCT/US2016/046790 dated Aug. 12, 2016, 10 pages.

(Continued)

*Primary Examiner* — Brian J. Gillis
*Assistant Examiner* — Javier O Guzman
(74) *Attorney, Agent, or Firm* — Lowenstein Sandler LLP (57) ABSTRACT

A notification that has been generated for a user may be identified. The notification may pertain to a media content item. A determination may be made as to whether the user interacted with the media content item, and a further determination may be made as to whether the user has interacted with the notification. In response to determining that the user has interacted with the media content item and has not interacted with the notification pertaining to the media content item, an affinity score of the user with respect to the notification may be calculated. A condition associated with providing a subsequent notification to the user may be determined based on the affinity score of the user.

18 Claims, 8 Drawing Sheets

(56) References Cited

U.S. PATENT DOCUMENTS

| | | | | |
|---|---|---|---|---|
| 8,707,201 | B1* | 4/2014 | Aradhye | G06F 17/3053 |
| | | | | 715/789 |
| 8,738,723 | B1* | 5/2014 | Faaborg | H04L 51/04 |
| | | | | 709/206 |
| 2004/0223485 | A1 | 11/2004 | Arellano et al. | |
| 2007/0143417 | A1* | 6/2007 | Daigle | G06Q 10/107 |
| | | | | 709/206 |
| 2011/0153414 | A1 | 6/2011 | Elvekrog et al. | |
| 2011/0161987 | A1* | 6/2011 | Huang | G06Q 10/10 |
| | | | | 719/318 |
| 2012/0323933 | A1* | 12/2012 | He | G06Q 10/107 |
| | | | | 707/749 |
| 2013/0036173 | A1 | 2/2013 | Kuhlman et al. | |
| 2013/0073624 | A1 | 3/2013 | Nguyen et al. | |
| 2013/0124309 | A1* | 5/2013 | Traasdahl | H04L 67/22 |
| | | | | 705/14.49 |
| 2013/0222133 | A1* | 8/2013 | Schultz | G08G 1/205 |
| | | | | 340/539.13 |
| 2013/0275530 | A1* | 10/2013 | Matson | H04L 51/24 |
| | | | | 709/206 |
| 2013/0325922 | A1* | 12/2013 | Chaudhri | G06Q 10/10 |
| | | | | 709/203 |
| 2014/0129661 | A1* | 5/2014 | Thyagaraja | G06F 9/542 |
| | | | | 709/207 |
| 2014/0149538 | A1* | 5/2014 | Deeter | H04L 67/26 |
| | | | | 709/217 |
| 2014/0273978 | A1* | 9/2014 | Van Snellenberg | H04W 4/14 |
| | | | | 455/412.2 |
| 2014/0358574 | A1* | 12/2014 | Tara | G06F 19/3425 |
| | | | | 705/2 |
| 2015/0019654 | A1 | 1/2015 | Wheeler et al. | |
| 2015/0039685 | A1 | 2/2015 | Lewis et al. | |
| 2015/0213024 | A1* | 7/2015 | Frankel | G06F 17/3053 |
| | | | | 707/758 |
| 2016/0315902 | A1* | 10/2016 | Silva | H04L 51/32 |
| 2016/0366085 | A1* | 12/2016 | Touloumtzis | H04L 67/24 |
| 2017/0017351 | A1* | 1/2017 | Singh | G06Q 10/10 |

OTHER PUBLICATIONS

International Preliminary Report on Patentability for for International application No. PCT/US2016/046790 dated Feb. 20, 2018, 6 pages.

Extended European Search Report for Application No. 16837588.9, dated Jan. 28, 2019, 8 pages.

Decision on Grant a Patent for Invention, for Application No. 2017137789/07(066003), dated Nov. 23, 2018, 22 pages.

* cited by examiner

NOTIFICATION TARGETING BASED ON DOWNSTREAM USER ENGAGEMENT

TECHNICAL FIELD

The present disclosure is generally related to notifications, and is more specifically related to notification targeting based on downstream user engagement.

BACKGROUND

Content sharing platforms provide digital content hosting and delivery services to users by allowing the users to upload, view, and share digital content items. The digital content items may include media items including audio clips, movie clips, television clips, music videos, and other multimedia content. The content sharing platform may provide notifications to the users. For example, the notifications may deliver a message informing a user about the availability of a particular media content item.

SUMMARY

The following is a simplified summary of the disclosure in order to provide a basic understanding of some aspects in the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the present disclosure may include a method to identify a notification that has been generated for a user where the notification pertains to a media content item. A determination is made as to whether the user interacted with the media content item, and a further determination is made as to whether the user has interacted with the notification. In response to determining that the user has interacted with the media content item and has not interacted with the notification pertaining to the media content item, an affinity score of the user with respect to the notification may be calculated. A condition associated with providing a subsequent notification to the user based on the affinity score may be determined.

In some embodiments, the determination as to whether the user has interacted with the media content item may be in response to determining whether the interaction from the user with the media content item occurred within a threshold period of time from the transmitting of the notification to the user.

In some embodiments, the determining as to whether the user has interacted with the media content item may include determining that the user has interacted with the media content item from a first device corresponding to the user and not from a second device that has presented the notification pertaining to the media content item to the user. In some embodiments, the notification pertaining to the media content item may be a delivered notification that has been transmitted to the user or a queued notification that has been generated for the user and has not yet been transmitted to the user. In some embodiments, the condition defines a type of the subsequent notification and when the subsequent notification may be transmitted to the user.

In some embodiments, the notification pertaining to the media content item may include a reference to the media content item to identify the media content item to the user, the user may interact with the media content item by accessing the media content item, and the user may interact with the notification when the user has accessed the media content item through the reference in the notification.

In some embodiments, a non-transitory machine-readable storage medium storing instructions may be executed to cause a processing device to perform operations such as identifying a notification that has been generated for a user where the notification pertains to a media content item. The operations may further determination as to whether the user interacted with the media content item, and a further determination is made as to whether the user has interacted with the notification. In response to determining that the user has interacted with the media content item and has not interacted with the notification pertaining to the media content item, the operations may further calculate an affinity score of the user with respect to the notification. Subsequently, the operations may further determine a condition associated with providing a subsequent notification to the user based on the affinity score.

In some embodiments, a system may include a memory and a processing device coupled to the memory. The processing device may receive a data set of user behavior corresponding to a user and identify from the data set, a notification pertaining to a media content item generated for the user. The processing device may also determine whether the user interacted with the media content item, and further determine whether the user has interacted with the notification. Furthermore, the processing device may calculate an affinity score associated with the notification based on the user interacting with the media content item while not interacting with the notification pertaining to the media content item. The processing device may further generate a subsequent notification for the user based on the affinity score.

BRIEF DESCRIPTION OF THE DRAWINGS

The present disclosure is illustrated by way of example, and not by way of limitation, in the figures of the accompanying drawings.

DETAILED DESCRIPTION

Aspects of the present disclosure relate to notification targeting based on downstream user engagement. A content sharing platform may provide media content items (e.g., videos) to users and may provide notifications to the users regarding certain media content items. For example, a notification may be provided to a user to alert the user that a particular media content item has been uploaded to the content sharing platform. The notification may identify the media content item and provide a link to the media content item at the content sharing platform so that the user may view or access the media content item through the link in the notification.

Providing a large number of notifications to a user may have adverse consequences. For example, unsolicited notifications may be considered undesirable and may cause the user to disable receipt of notifications. In some cases, the user may stop using a content sharing platform that sends excessive or irrelevant notifications.

An affinity score may be used to target notifications to the user and to indicate whether the notifications that are provided to the user are relevant and/or desirable for the user. The affinity score may be based on a user's interaction with a notification. For example, if the user accesses a media content item through a link in a notification, then the affinity score corresponding to a classification of the notification may be increased. A subsequent notification of the same classification may then be provided to the user based on the affinity score. For example, if the affinity score is at a level that indicates that the user has a high interest level for notifications of the corresponding classification, then the subsequent notification that is provided to the user may be of the same or similar classification. The classification of the notification may be a type of notification (e.g., a delivery type), a subject matter of the content item of the notification, a channel that includes the content item, etc. In some embodiments, a user may be associated with multiple affinity scores where each of the user's affinity scores corresponds to a different classification of notifications.

However, in instances where notifications pertaining to a media content item are generated for a user, but the user engages with the media content item without accessing the media content item through the notification, it may be more difficult to gauge the user's interest level for the notification. For example, a notification for a particular media content item may be provided to a user who may receive and view the notification for the particular media content item on a first device (e.g., a mobile phone), but may not access the media content item through the notification. Instead, at a later time, the user may access the media content item from a second device (e.g., a desktop computer). Similarly, a notification may be generated and placed for a user in a notification queue, but the user may access the media content item before the notification for the media content item has been provided to the user. In both cases, the user accessing the media content item may not result in an increase in the affinity score associated with the classification of the corresponding notification.

Aspects of the present disclosure address the above and other deficiencies by analyzing downstream user behavior to identify whether a notification that has been generated for the user may have been of interest to the user despite the user not accessing a media content item through the notification. For example, the behavior of the user after a notification has been generated (e.g., transmitted to the user's device or placed in a notification queue) may be analyzed to identify whether the user has viewed a particular media content item after the notification for the media content item has been generated. If the user has viewed the media content item while not accessing the media content item through the generated notification, the affinity score corresponding to a classification of the notification may be increased. The affinity score may then be used to target a later notification to the user. For example, a subsequent notification corresponding to the classification of the affinity score may be provided to the user.

As an example, a video may be received by a content sharing platform. A notification identifying the video and providing a link to the video may be transmitted to a mobile phone of the user. The user may view the notification on her mobile phone and may at a later time search for the video on the content sharing platform from her desktop computer. By analyzing the downstream user engagement, the affinity score corresponding to the transmitted notification may be increased based on the user viewing the media content item on the desktop computer despite not accessing the media content item through the notification transmitted to the mobile phone.

Accordingly, aspects of the present disclosure improve notification targeting by identifying notifications that are likely to be relevant and/or desirable for a user. This improved notification targeting can be especially important for mobile applications that rely heavily on notifications to increase mobile application usage by a user.

Figure 1:
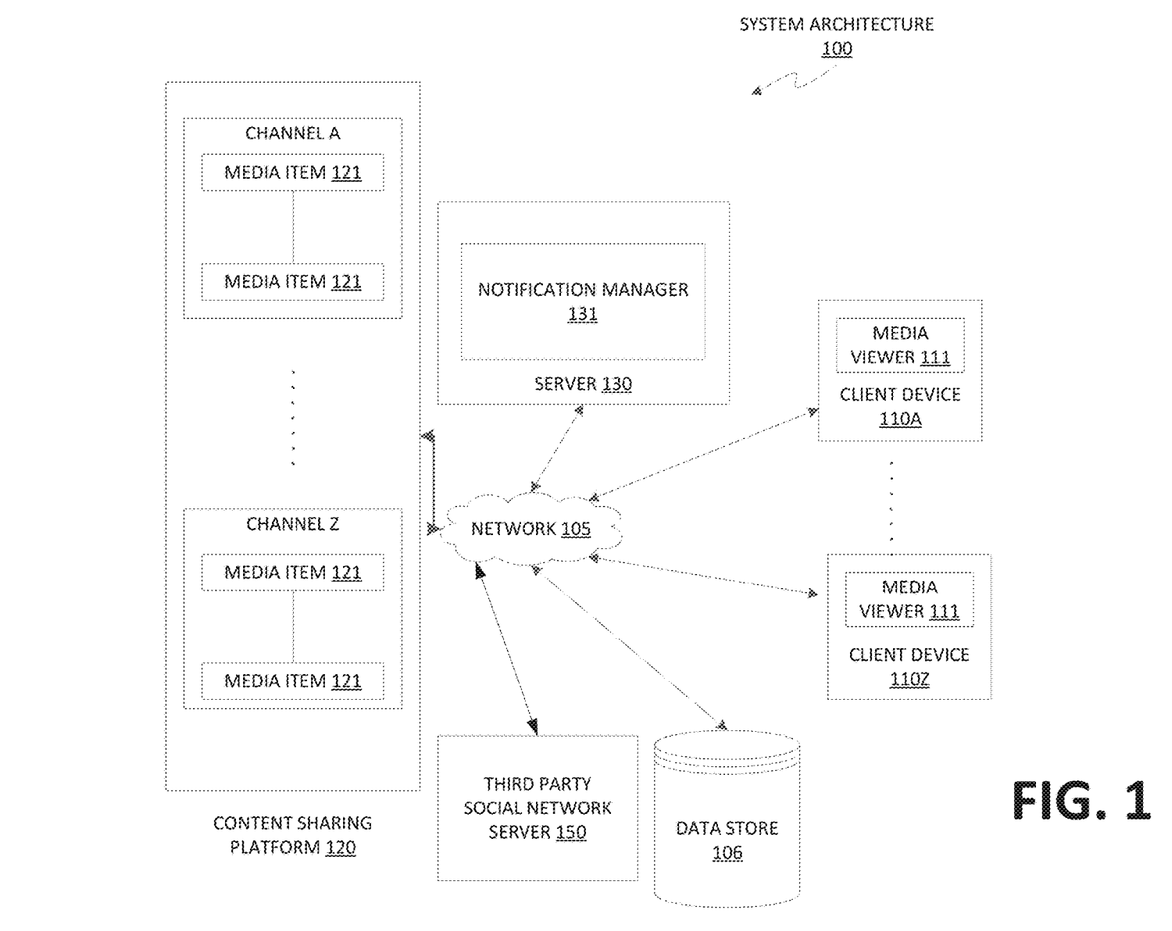
FIG. 1 illustrates an example system architecture in which embodiments of the present disclosure may operate.

FIG. 1 illustrates an example system architecture 100. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, network connected televisions, netbook computers etc. In some implementations, client device 110A through 110Z may also be referred to as "user devices." Each client device includes a media viewer 111. In one implementation, the media viewers 111 may be applications that allow users to view content or media content items, such as images, videos, web pages, documents, etc. For example, the media viewer 111 may be a web browser that can access, retrieve, present, and/or navigate content (e.g., web pages such as Hyper Text Markup Language (HTML) pages, digital media items or media content items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that communicate with the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as media content items) and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on. In some embodiments, the classification associated with an affinity score may correspond to a channel. For example, each channel may be associated with an affinity score that is used to determine whether a subsequent notification may be generated to identify a media content item from the corresponding channel.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books ("eBooks"), electronic magazines, digital newspapers, digital audio books, electronic journals, web blogs, real simple syndication (RSS) feeds, electronic comic books, software applications, etc. In some implementations, media item 121 is also referred to as a content item or a media content item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," "media content item," and "content item" can include an electronic file that can be executed or loaded using software, firmware or hardware configured to present the digital media item to an entity. In one implementation, the content sharing platform 120 may store the media items 121 using the data store 106. The content sharing platform 120 may also transmit notifications to users based on the media items 121.

In one implementation, the server 130 may be one or more computing devices (e.g., a rackmount server, a server computer, etc.). The server 130 may be included in the content sharing platform 120 or be part of a different system. The server 130 may host a notification manager 131 that manages notifications for media content items. The notification manager 131 may determine conditions associated with providing notifications to users. For example, the notification manager 131 may determine whether to generate a notification pertaining to a particular media item for a user, which user device a notification should be transmitted to, timing for transmitting a notification, etc. In some implementations, the notification manager 131 may be part of a notification service that generates and transmits notifications based on conditions determined by the notification manager 131. Alternatively, the notification manager 131 may be a separate component (e.g., a module of a separate application or platform such as the content sharing platform 120, an independent application or platform, etc.) that provides notification instructions to a separate notification service (e.g., via network 105).

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, a user's current location, or specific content items watched by a user), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
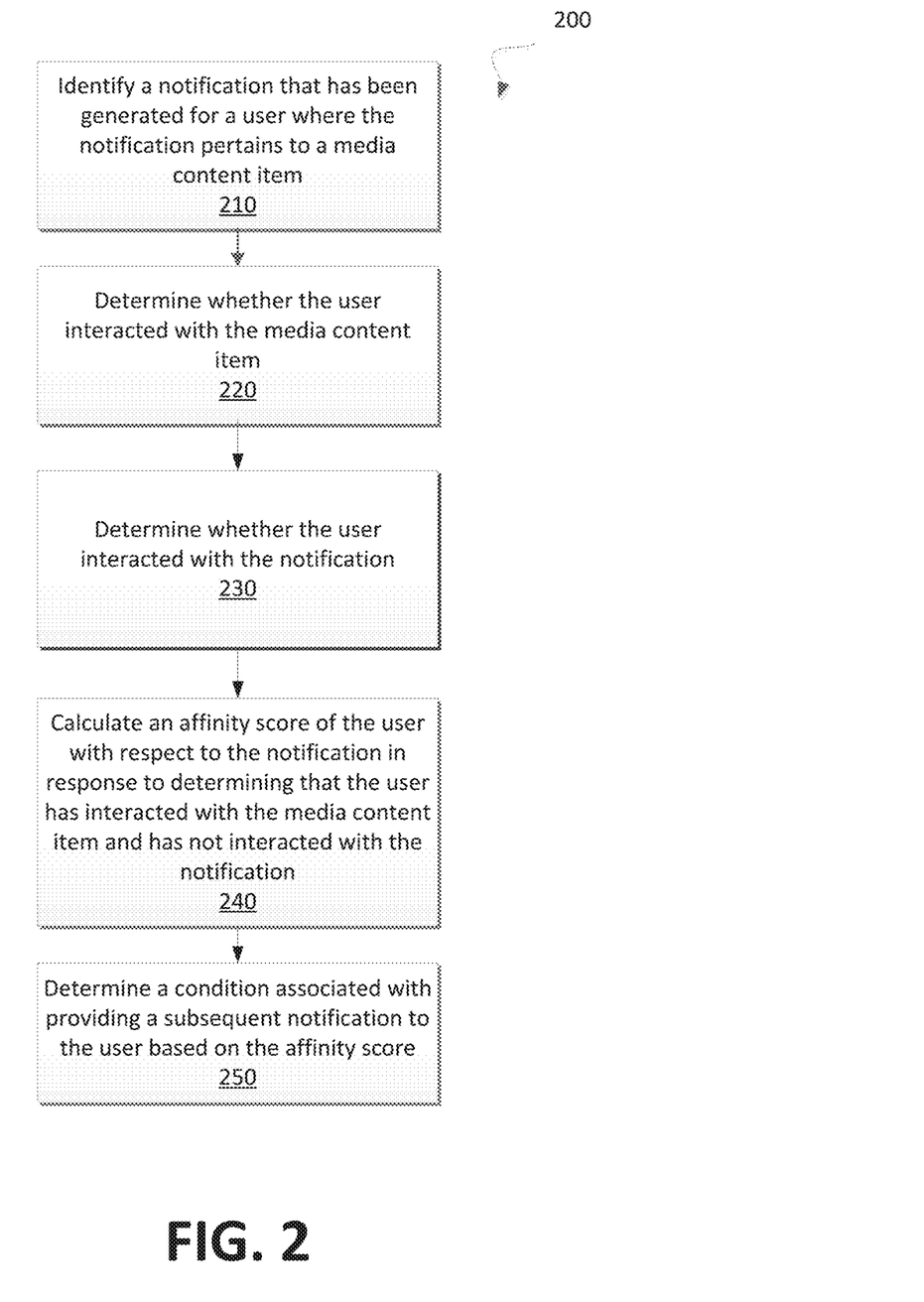
FIG. 2 is a flow diagram of an example method to target media content notifications based on downstream user engagement in accordance with some embodiments.

FIG. 2 is a flow diagram of an example method to target media content notifications based on downstream user engagement. In general, the method 200 may be performed by processing logic that may comprise hardware (e.g., processing device, circuitry, dedicated logic, programmable logic, microcode, etc.), software (e.g., instructions run on a processing device), or a combination thereof. In some embodiments, the method 200 may be performed by the notification manager 131 of FIG. 1.

As shown in FIG. 2, the method 200 may begin by the processing logic identifying a notification (pertaining to a media content item) that has been generated for the user. The notification may be identified from a data set of user behavior. The data set of user behavior may correspond to a compilation of activity the user engages on a content sharing platform (e.g., watching a video). For example, the data set of user behavior may include a list of all videos the user has viewed in a particular time period (e.g., the last 30 days). The data set of user behavior may also include a list of notifications corresponding to the user. The list of notifications may include notifications that have been delivered to a user ("delivered notification") and notifications that have been queued for delivery to a user ("queued notification"). The data set may correspond to a log or record of the user interacting with the content sharing platform. In some embodiments, the notification manager 131 may identify that a notification of a new music video has been delivered to a user's mobile phone or has been generated for the user and placed in a notification queue to be transmitted to the user's mobile phone at a later time to the user. The notification may include a reference (e.g., a link) to the music video.

At block 220, the processing logic may determine whether the user interacted with the media content item. For example, the notification manager 131 may parse the data set of user behavior to identify whether the user accessed or watched the music video. For example, a search may be performed to identify the media content items that the user has viewed within a particular time period (e.g., the previous thirty days) and may cross reference the media content items that the user has viewed with any notifications that the user may have received or that have been generated for the user. The search may be based, for example, on a map-reduce framework.

At block 230, the processing logic may further determine whether the user has interacted with the notification pertaining to the media content item. For example, the notification manager 131 may parse the data set of user behavior to identify whether the user has clicked on or otherwise selected the link in the notification to watch the music video. For example, a determination may be made as to whether a particular notification has been provided to the user and that the user has interacted with the notification to view the media content item identified in the notification.

At block 240, the processing logic may calculate an affinity score of the user with respect to the notification in response to determining that the user has interacted with the media content item and has not interacted with the notification. For example, the user may have watched the music video by searching or browsing the content sharing platform to find the music video instead of accessing the video through the link in the notification. In such an instance, a positive affinity signal would be provided for an affinity score associated with the notification even if the user did not access the video through the link in the notification.

The affinity signal may be used to increase or decrease the affinity score. For example, a positive affinity signal may increase the affinity score that corresponds to a classification of the notification, while a negative affinity signal may decrease the affinity score. In some implementations, a higher affinity score may indicate that the user may find media content items similar to the media content item in the notification more desirable. In other implementations, a lower affinity score may indicate that the user may find media content items similar to the media content item in the notification more desirable.

Various factors pertaining to the notification may affect the affinity signal's level of contribution to the affinity score. One such factor may pertain to the method of delivery of the notification (e.g., a mobile notification, a chat notification, an email notification, etc.). In some embodiments, the affinity signal of a mobile notification may contribute more to the affinity score than the affinity signal of an email notification. For example, the positive affinity signal of a mobile notification may increase the affinity score by two points, while the positive affinity signal of an email notification may increase the affinity score by one point. As such, the type of notification that is provided or generated for a user may have a different change in the affinity score so that a first type of notification may result in a first change to the affinity score while a second type of notification may result in a second change to the affinity score where the first change and the second change are different.

Another factor which may affect the affinity signal's level of contribution to the affinity score may be a type of the media content item of the notification. In some embodiments, the type of media content item may pertain to subscribed media content, suggested media content, popular media content, or referred media content. Subscribed media content may correspond to media content items in a subscribed topic channel (a video channel subscribed by the user on the content sharing platform). Suggested media content may correspond to media content items suggested by the content sharing platform for the user. Popular media content may correspond to media content items recently viewed by a large number of users of the content sharing platform. Referred media content may correspond to media content items recommended by another user (e.g., a friend suggesting a popular video the user may be interested in watching). In one embodiment, the affinity signal of a notification pertaining to subscribed media content may contribute more to the affinity score than the affinity signal of a notification pertaining to referred media content. For example, the positive affinity signal of the notification pertaining to subscribed media content may increase the affinity score by three points, while the positive affinity signal of a notification pertaining to referred media content may increase the affinity score by two points.

At block 260, the processing logic may determine a condition for providing a subsequent notification to the user based on the affinity score. The condition may be whether or not a subsequent notification should be generated for the user, which notification type should be used for the subsequent notification, the timing for the subsequent notification, etc. The affinity score may indicate that the user may be interested in future similar media content items, similar topic channels, or other media content items by a particular author or uploader. The processing logic may generate a subsequent notification for the user if the affinity score exceeds a threshold value. For example, if the threshold value for a music video channel is at a particular value, a subsequent notification may be generated for a new video uploaded to the music video channel if the affinity score exceeds the particular value.

In some embodiments, the affinity score may determine a type of the subsequent notification and when the subsequent notification is transmitted to the user. For example, an affinity score at a high value may determine the subsequent notification may be a mobile notification transmitted immediately to the user, while an affinity score at a lower value may determine the subsequent notification may be an email notification delivered in 24 hours. Thus, the affinity score may be used to select a subsequent media content item that is identified in a notification and how or when a subsequent notification may be transmitted or generated for a user.

Figure 3:
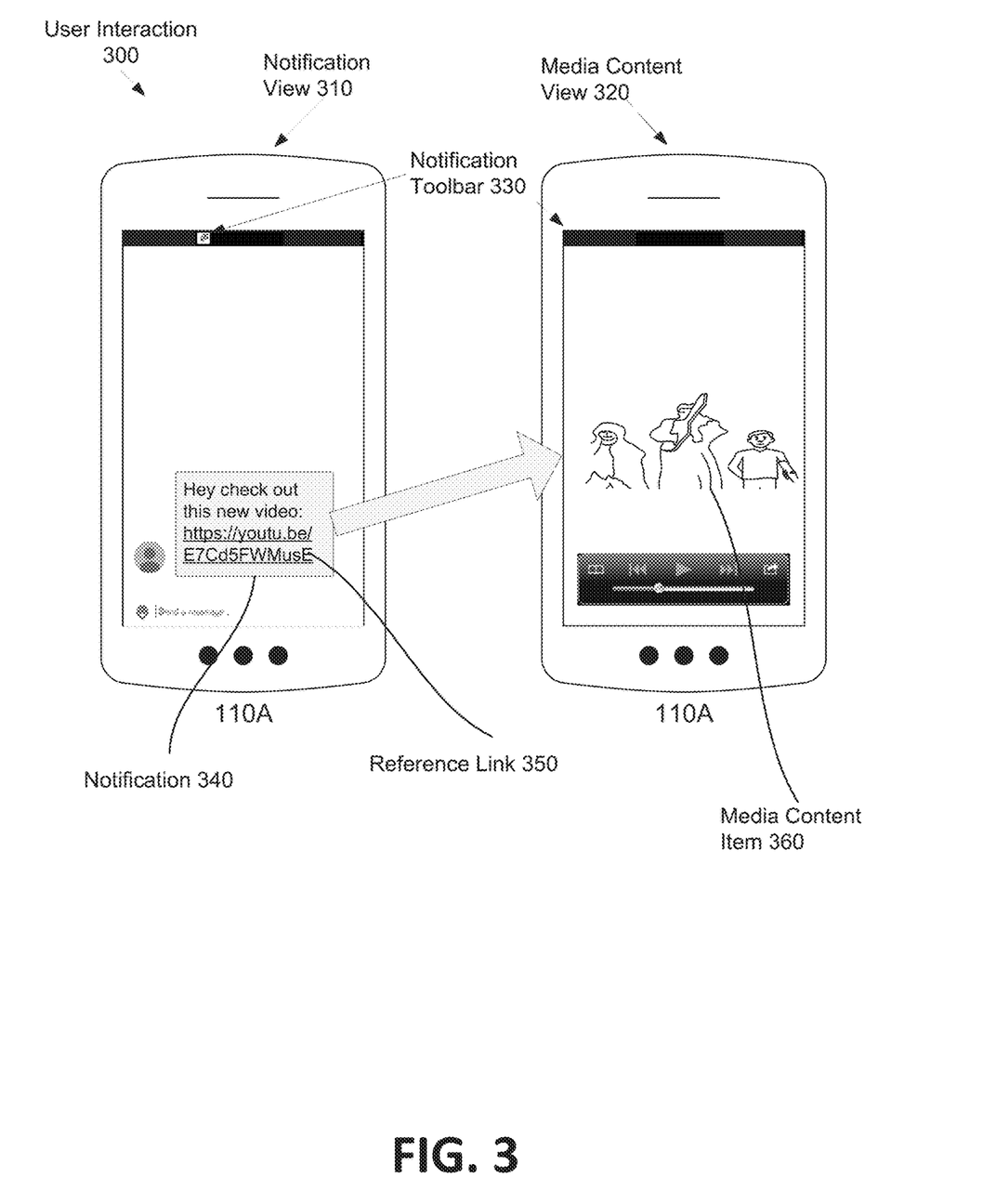
FIG. 3 is an illustrative example of a user interaction with a media content item through a notification in accordance with some embodiments.

FIG. 3 is an illustrative example of a user interaction 300 with a media content item through a notification. The user interaction 300 includes a client device 110A that may be a mobile device. The client device 110A may include a notification view 310 and a media content view 320. The notification view 320 may include a notification toolbar 330 and a notification 340. The notification may include a reference link 350. The media content view 320 may include a media content item 360.

The example user interaction 300 with a media content item through a notification begins with the transmitting of a notification to a device (e.g., a mobile device) of a user. The mobile device may display a pop-up or other such message in the notification toolbar 330 indicating that a notification has been received by the device from a content sharing platform. The user may click or select a notification indicator from the notification toolbar 330 to display the notification 340. The notification 340 may inform the user of the availability of a media content item 360 (e.g., a video) and includes a reference link 350 to the media content item. The notification may further identify the media content item 360. For example, the notification may identify a title and/or an author or uploader of the media content item 360. The user may click or select the reference link 350 to initiate playback of the media content item 360. The processing logic may identify that the user interacted with the notification 340 through the reference link 350 (e.g., clicking or selecting the link). The reference link 350 may initiate the media content view 320. The media content view 320 may include playback of the media content item 360 so that the user of the device may view or access the media content item 360. The processing logic may determine that the user interacted with the media content item 360 (e.g., the user watched the video). In such an instance, the notification may correspond to a positive affinity signal that increases an affinity score associated with the notification for the user.

Figure 4A:
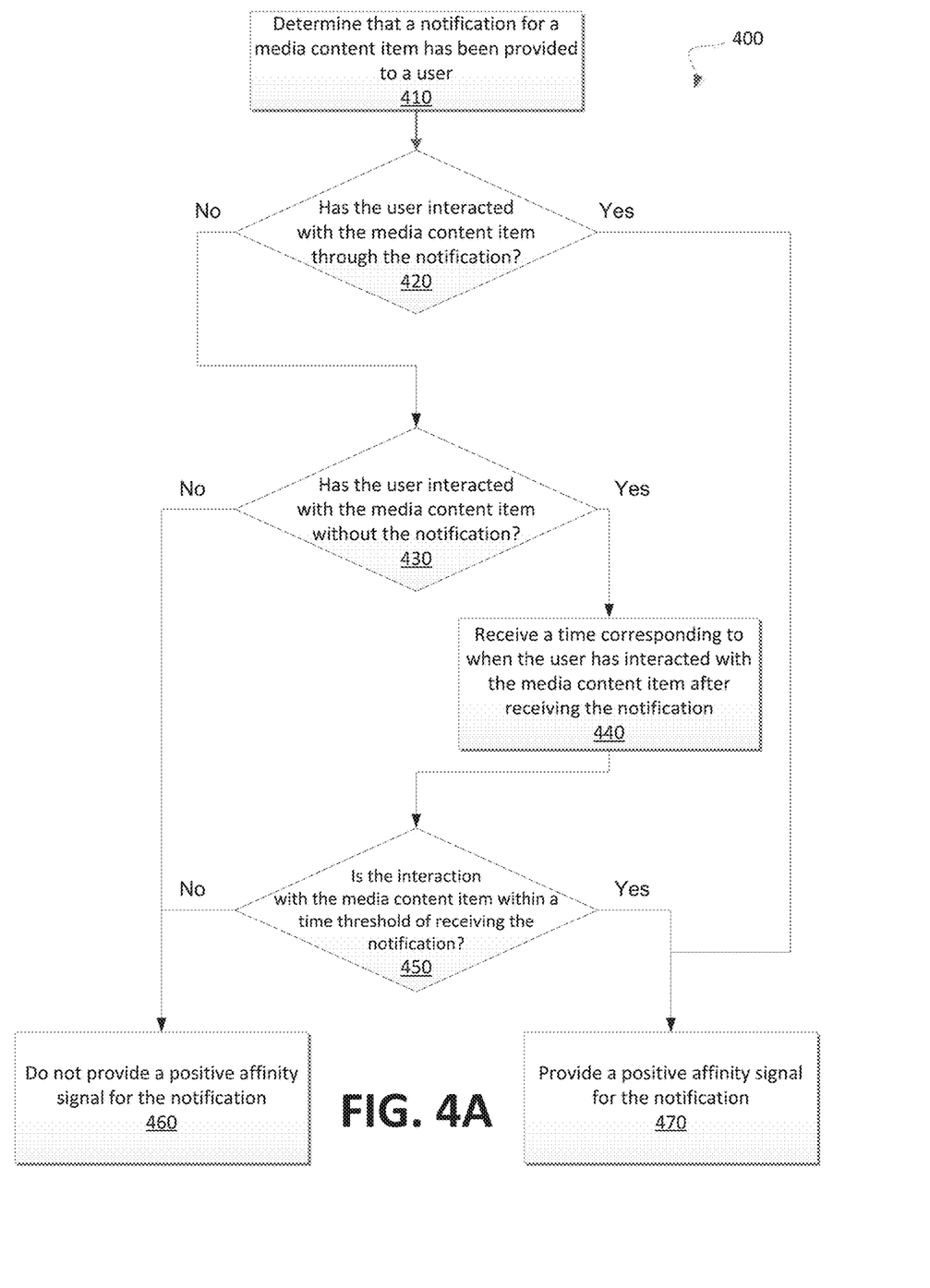
FIG. 4A is a flow diagram of an example method to determine an affinity signal for a delivered notification of a media content item in accordance with some embodiments of the present disclosure.

FIG. 4A is a flow diagram of an example method to target media content notifications based on downstream user engagement. In general, the method 400 may be performed by processing logic that may comprise hardware (e.g., processing device, circuitry, dedicated logic, programmable logic, microcode, etc.), software (e.g., instructions run on a processing device), or a combination thereof. The method 400 may be performed by the notification manager 131 of FIG. 1.

As shown in FIG. 4A, the method 400 may begin by the processing logic determining that a notification for a media content item has been provided to a user (block 410). For example, the notification may be transmitted to a device of the user. At block 420, the processing logic may determine whether the user has interacted with the media content item through the notification. Upon determining the user has interacted with the media content item through the notification, the processing logic may provide a positive affinity signal for the notification at block 470. The affinity score associated with the notification (e.g., a classification of the media content item of the notification) may be increased in response to the positive affinity signal.

If the processing logic determines the user has not interacted with the media content item through the notification, a determination may be made as to whether the user has interacted with the media content item without interacting with the notification (block 430). For example, the user may visit the content sharing platform and browse or search for the media content item. The user may then view the media content item.

If the processing logic determines the user has not interacted with the media content item, the processing logic may not provide a positive affinity signal for the notification at block 460. In some embodiments, the processing logic may provide a negative affinity signal for the notification to decrease the corresponding affinity score. However, if the processing logic determines that the user has viewed the media content item without interacting with the notification, the processing logic may receive a time corresponding to when the user has interacted with the media content item after receiving the notification (block 440). For example, the processing logic may receive a time of 72 hours if the user viewed the media content item 72 hours after receiving the notification. Thus, an amount of time that has passed between the notification being transmitted to the user and the user viewing the media content item referenced in the notification may be identified.

At block 450, the processing logic determines if the interaction with the media content item is within a time threshold of receiving the notification. For example, the time threshold of the interaction may be 96 hours. If the user viewed the media content item within 96 hours of receiving the notification, a positive affinity signal may be provided for the notification at block 470. However, if the user viewed the media content item within a time interval exceeding the time threshold (e.g., 97 hours), the processing logic may not provide a positive affinity signal for the notification at block 460. Thus, if the user has accessed the media content item within a time interval that is equal to or less than the time threshold, then a positive affinity signal may be provided and if the user has accessed the media content item within a time interval that is greater than the time threshold, then the positive affinity signal may not be provided. In some embodiments, the amount of change to the affinity score may be based on when the user has accessed the media content item within the time threshold. For example, the affinity score may be increased by a larger amount when the user has accessed the media content item sooner than when the user has accessed the media content at a later time.

In some embodiments, the time threshold for a particular notification may be different based on the type of notification. For example, a first type of notification (e.g., an email notification) may be associated with a time threshold at a first value and a second type of notification may be associated with a time threshold at a second value that is different than the first value. For example, an email notification may be associated with a time threshold of one week while a mobile notification (e.g., a notification transmitted to a mobile device) may be two days (e.g., less than the time threshold for the email notification).

Figure 4B:
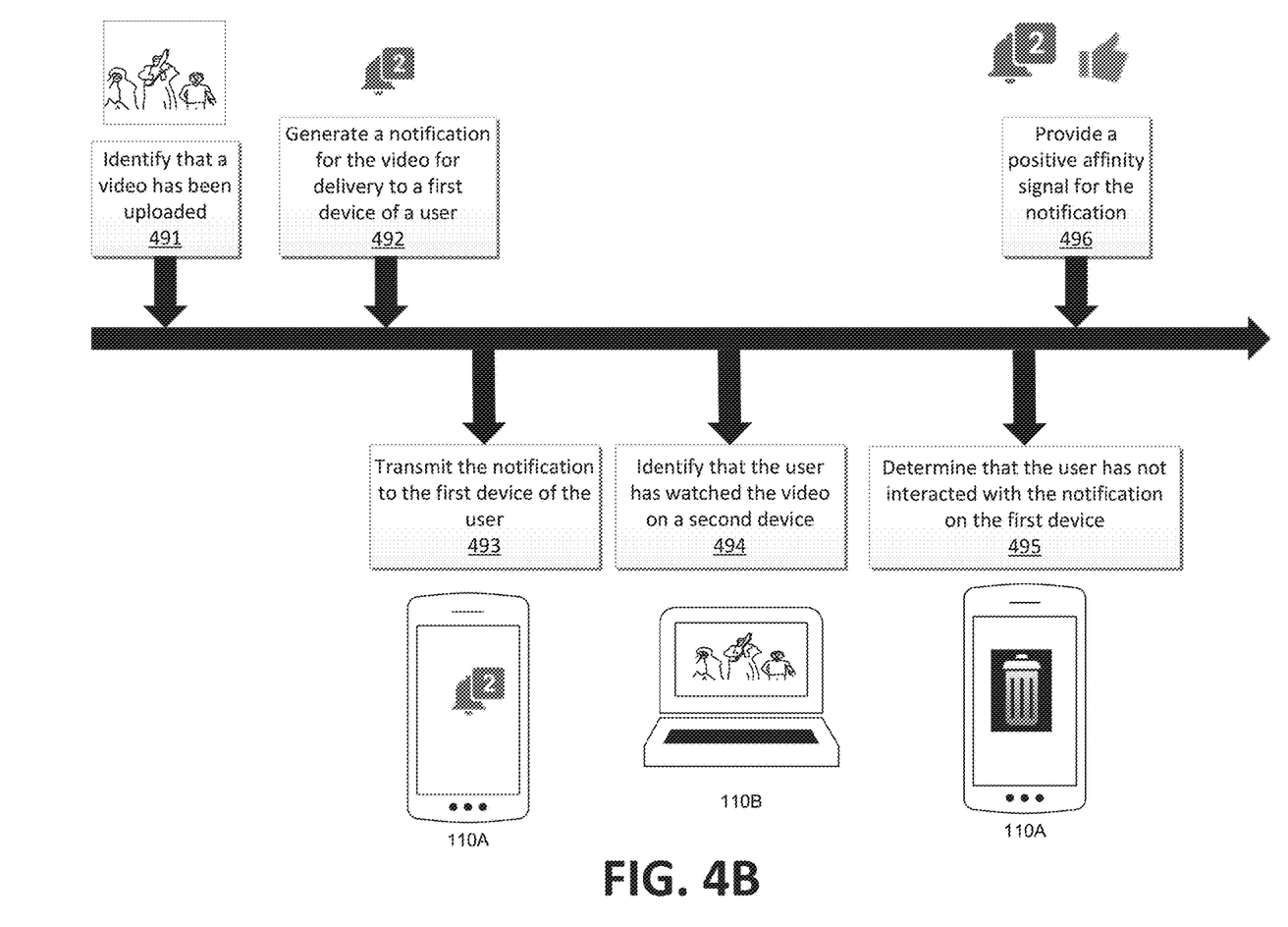
FIG. 4B is an illustrative example to determine an affinity signal for a delivered notification of a media content item in accordance with some embodiments.

FIG. 4B is an illustrative example to determine an affinity signal for a provided notification of a media content item. For example, a user may view a media content item on a laptop after receiving a corresponding notification on a mobile device. In such an instance, a positive affinity signal may be provided for the notification upon determining that the user has not interacted with the notification but has viewed the media content item. FIG. 4B may be an example illustration of method 400 illustrated in FIG. 4A.

At time 491, processing logic may identify that a video has been uploaded. For example, the video may be uploaded by another user to a content sharing platform. The processing logic may then generate a notification for the video for delivery to a first device (e.g., mobile phone) of a user at time 492. The notification may be transmitted to the first device of the user at 493. For example, the notification may be transmitted to the first device of the user based on a user account of the user being identified at the first device. However, the user may decide not to interact with the notification transmitted to the first device and may instead watch the video on a second device. For example, the notification manager 131 may transmit a notification to the user's mobile device that a new music video has been uploaded from the user's favorite band. The user may view the notification, but may be busy and decide not to watch the music video at the time of receiving the notification. However, the user may later decide to browse for the video on the user's laptop by navigating directly to the content sharing platform. The user watches the video on the laptop without interacting with the notification on the mobile phone.

The processing logic may identify that the user has watched the video on a second device at time 494. At time 495, the processing logic may further determine that the user has not interacted with the notification on the first device. For example, the notification manager 131 may parse the data set of user behavior as described above to identify that the user has watched the music video on the laptop, and further determine that the user has not click on or selected the link on the notification that has been transmitted to the mobile device. At time 496, the processing logic may provide a positive affinity signal for the notification even though the user has not interacted with the notification.

Figure 5A:
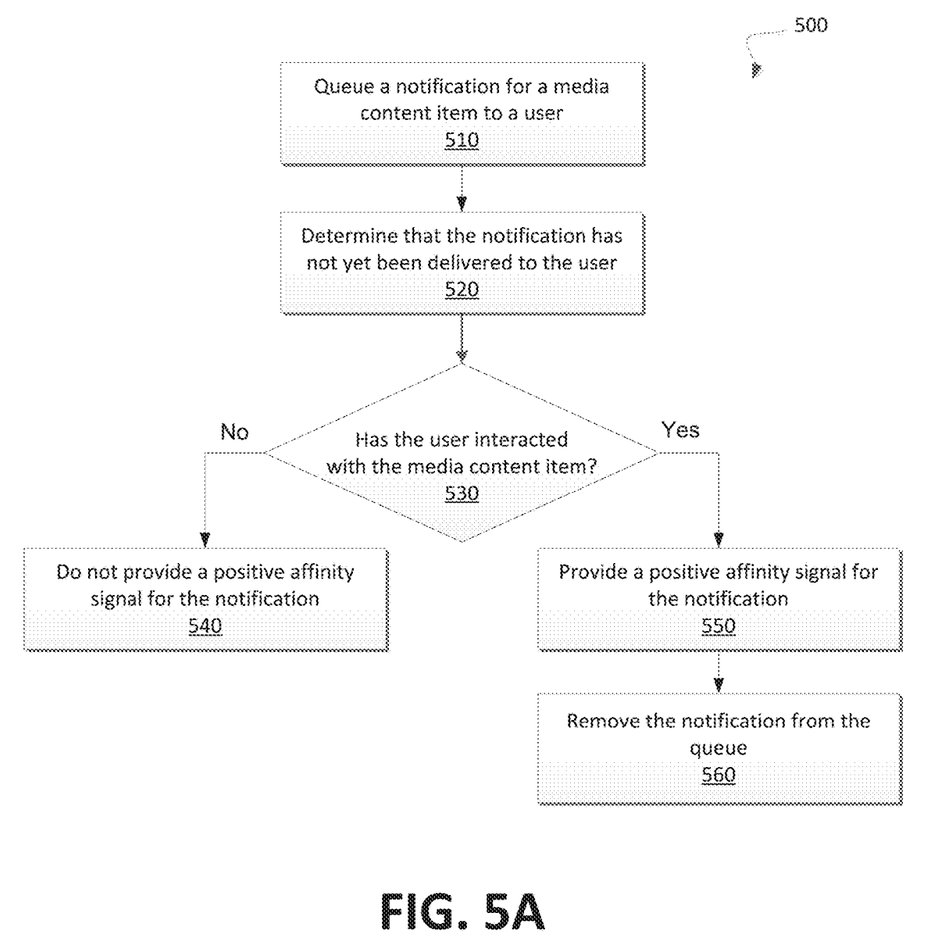
FIG. 5A is a flow diagram of an example method to determine an affinity signal for a queued notification of a media content item in accordance with some embodiments of the present disclosure.

FIG. 5A is a flow diagram of an example method to determine an affinity signal for a queued notification of a media content item in accordance with some embodiments of the present disclosure. In general, the method 500 may be performed by processing logic that may comprise hardware (e.g., processing device, circuitry, dedicated logic, programmable logic, microcode, etc.), software (e.g., instructions run on a processing device), or a combination thereof. The method 500 may be performed by the notification manager 131 of FIG. 1.

As shown in FIG. 5A, the method 500 may begin by the processing logic queueing a notification for a media content item to a user (block 510). For example, the notification manager 131 may generate a notification for a user at a time the user may not desire receiving notifications (e.g., 2 a.m.). The notification may be placed in a queue for delivery at a later or more appropriate time (e.g., 10 a.m.). The queue may include one or more notifications that have been generated for the user but have not yet been transmitted to the user. At block 520, the processing logic may determine that the notification has not yet been delivered to the user (e.g., the time is before 10 a.m.).

At block 530, the processing logic may determine whether the user has interacted with the media content item. For example, the user may wake up a time prior to the notification being delivered to the user (e.g., 8 a.m.) and decide to browse the content sharing platform and watch the media content item prior to receiving the notification. If the user has not interacted with the media content item, a positive affinity signal may not yet be provided for the notification at block 540. Upon determining the user interacted with the media content item, the positive affinity signal may be provided for the notification at block 550. The processing logic may further remove the notification from the queue at block 560. Thus, the processing logic may not transmit a notification for the media content item to the user if the user has already viewed the media content item and an affinity score associated with the notification may be increased despite the notification not being transmitted to the user.

Figure 5B:
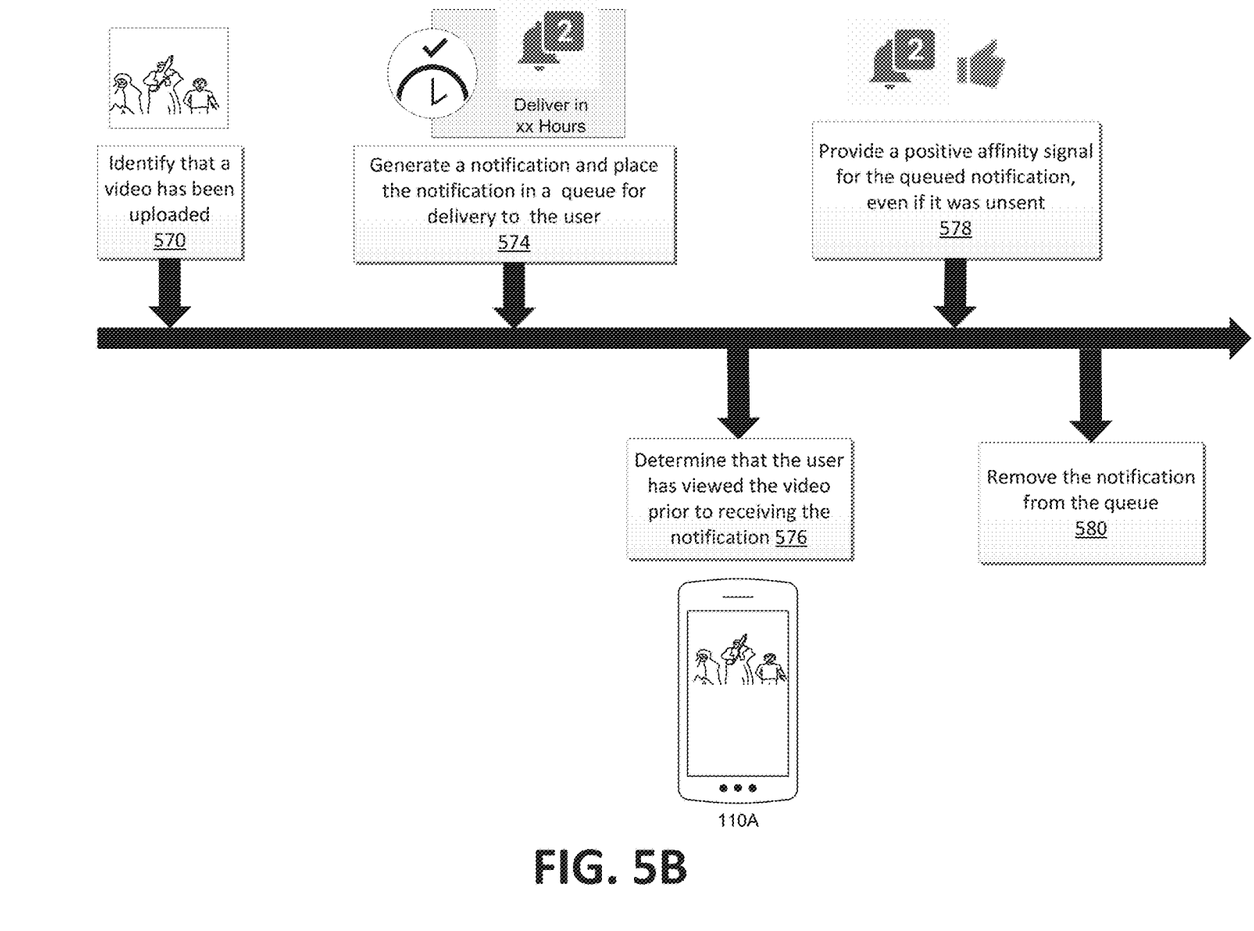
FIG. 5B illustrates an example to determine an affinity signal for a queued notification of a media content item in accordance with some embodiments of the present disclosure.

FIG. 5B illustrates an example to determine an affinity signal for a queued notification of a media content item. For example, a notification may be generated for a media content item and placed in a queue for delivery to a user. The user may view the media content item prior to delivery of the notification. A positive affinity signal may be provided for the unsent queued notification, and the notification may be removed from the queue. FIG. 5B may be an example illustration of method 500 illustrated in FIG. 5A.

At time 570, the processing logic may identify that a video has been uploaded. The processing logic may then generate a notification for the video and place the notification in a queue for the user at time 574. At time 576, the processing logic may determine that the user has viewed the video prior to receiving the notification or the notification being transmitted to the user. For example, the notification manager 131 may generate a notification for a new video for a user and place the notification in a queue for delivery in 24 hours. The user may discover the video by other means (e.g., friends, a popular blog, etc.) and decide to watch the video by directly searching the content sharing platform.

In such a case where the user watches the video prior to receiving the notification, at time 578 the processing logic may provide a positive affinity signal for the queued notification, even it is was unsent. At time 580, the processing logic may remove the notification from the queue.

Figure 6:
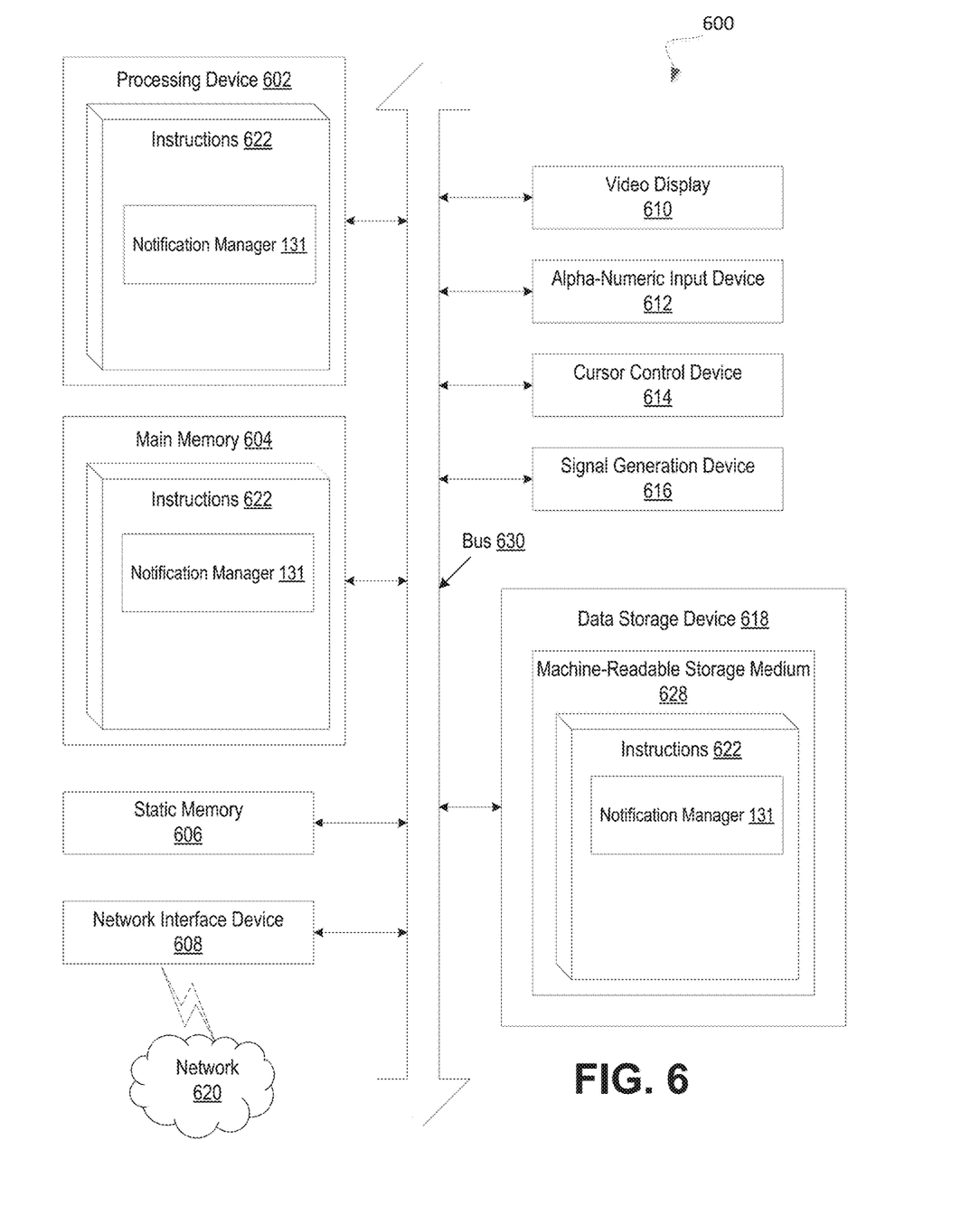
FIG. 6 illustrates a block diagram of an embodiment of a computer system in which some embodiments of the disclosure may operate.

FIG. 6 illustrates a block diagram of an embodiment of a computer system. Included in FIG. 6 is an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM, etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a notification manager (e.g., notification manager 131 of FIG. 1) and/or a software library containing methods of a notification manager. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    identifying a notification generated for a particular user, the notification being provided to a first device associated with the particular user and pertaining to a media content item;
    determining whether the particular user has interacted with the media content item at a second device associated with the particular user;
    determining whether the particular user has interacted with the notification by selecting a reference to the media content item within the notification;
    responsive to determining that the particular user has interacted with the media content item at the second device and has not interacted with the notification provided to the first device and pertaining to the media content item, calculating, by a processing device, an affinity score of the particular user with respect to the notification based on an amount of time that has elapsed between the notification that the particular user has not interacted with being provided to the particular user at the first device and the particular user interacting with the media content item referenced by the notification at the second device without interacting with the notification;
    determining whether to provide a subsequent notification to the particular user based on the affinity score of the particular user; and
    generating the subsequent notification for the particular user responsive to determining to provide the subsequent notification to the particular user based on the affinity score of the particular user.

2. The method of claim 1, further comprising:
    in response to determining that the particular user has interacted with the media content item, determining whether the interaction of the particular user with the media content item occurred within a threshold period of time from a transmission of the notification to the particular user.

3. The method of claim 1, wherein the notification pertaining to the media content item is one of a delivered notification that has been transmitted to the particular user or a queued notification that has been generated for the particular user and has not yet been transmitted to the particular user.

4. The method of claim 1, further comprising determining a type of the subsequent notification and when the subsequent notification is transmitted to the particular user.

5. The method of claim 1, wherein the reference to the media content item identifies the media content item to the particular user, and wherein the particular user has interacted with the media content item by accessing the media content item.

6. The method of claim 1, wherein the media content item is a video that has been received from a second user, and the notification is transmitted to the particular user in response to the receiving of the video from the second user.

7. The method of claim 1, wherein calculating the affinity score responsive to determining that the particular user has interacted with the media content item at the second device and has not interacted with the notification provided to the first device comprises:
    determining that the particular user has performed a search for the media content item at a content platform providing the media content item without selecting the reference to the media content item within the notification, the reference corresponding to a link to the media content item at the content platform.

8. A non-transitory machine-readable storage medium storing instructions which, when executed, cause a processing device to perform operations comprising:
    identifying a notification generated for a particular user, the notification being provided to a first device associated with the particular user and pertaining to a media content item;
    determining whether the particular user has interacted with the media content item at a second device associated with the particular user;
    determining whether the particular user has interacted with the notification by selecting a reference to the media content item within the notification;
    responsive to determining that the particular user has interacted with the media content item at the second device and has not interacted with the notification provided to the first device and pertaining to the media content item, calculating an affinity score of the particular user with respect to the notification based on an amount of time that has elapsed between the notification that the particular user has not interacted with being provided to the particular user at the first device and the particular user interacting with the media content item referenced by the notification at the second device without interacting with the notification;
    determining whether to provide a subsequent notification to the particular user based on the affinity score of the particular user; and
    generating the subsequent notification for the particular user responsive to determining to provide the subsequent notification to the particular user based on the affinity score of the particular user.

9. The non-transitory machine-readable storage medium of claim 8, the operations further comprising:
    in response to determining that the particular user has interacted with the media content item, determining whether the interaction of the particular user with the media content item occurred within a threshold period of time from a transmission of the notification to the particular user.

10. The non-transitory machine-readable storage medium of claim 8, wherein the notification pertaining to the media content item is one of a delivered notification that has been transmitted to the particular user or a queued notification that has been generated for the particular user and has not yet been transmitted to the particular user.

11. The non-transitory machine-readable storage medium of claim 8, the operations further comprising determining a type of the subsequent notification and when the subsequent notification is transmitted to the particular user.

12. The non-transitory machine-readable storage medium of claim 8, wherein the reference to the media content item identifies the media content item to the particular user, and wherein the particular user has interacted with the media content item by accessing the media content item.

13. The non-transitory machine-readable storage medium of claim 8, wherein the media content item is a video that has been received from a second user, and the notification is transmitted to the particular user in response to the receiving of the video from the second user.

14. A system comprising:
   a memory; and
   a processing device operatively coupled with the memory to:
      identify a notification generated for a particular user, the notification being provided to a first device associated with the particular user and pertaining to a media content item;
      determine whether the particular user has interacted with the media content item at a second device associated with the particular user;
      determine whether the particular user has interacted with the notification by selecting a reference to the media content item within the notification;
      responsive to determining that the particular user has interacted with the media content item at the second device and has not interacted with the notification provided to the first device and pertaining to the media content item, calculate an affinity score of the particular user with respect to the notification based on an amount of time that has elapsed between the notification that the particular user has not interacted with being provided to the particular user at the first device and the particular user interacting with the media content item referenced by the notification at the second device without interacting with the notification;
      determine whether to provide a subsequent notification to the particular user based on the affinity score of the particular user; and
      generate the subsequent notification for the particular user responsive to determining to provide the subsequent notification to the particular user based on the affinity score of the particular user.

15. The system of claim 14, wherein the processing device is further to:
   in response to determining that the particular user has interacted with the media content item, determine whether the interaction of the particular user with the media content item occurred within a threshold period of time from a transmission of the notification to the particular user.

16. The system of claim 14, wherein the notification pertaining to the media content item is one of a delivered notification that has been transmitted to the particular user or a queued notification that has been generated for the particular user and has not yet been transmitted to the particular user.

17. The system of claim 14, wherein the processing device is further to determine a type of the subsequent notification and when the subsequent notification is transmitted to the particular user.

18. The system of claim 14, wherein the reference to the media content item identifies the media content item to the particular user, and wherein the particular user has interacted with the media content item by accessing the media content item.

\* \* \* \* \*